INVENTOR.
ARTHUR B. DIXON

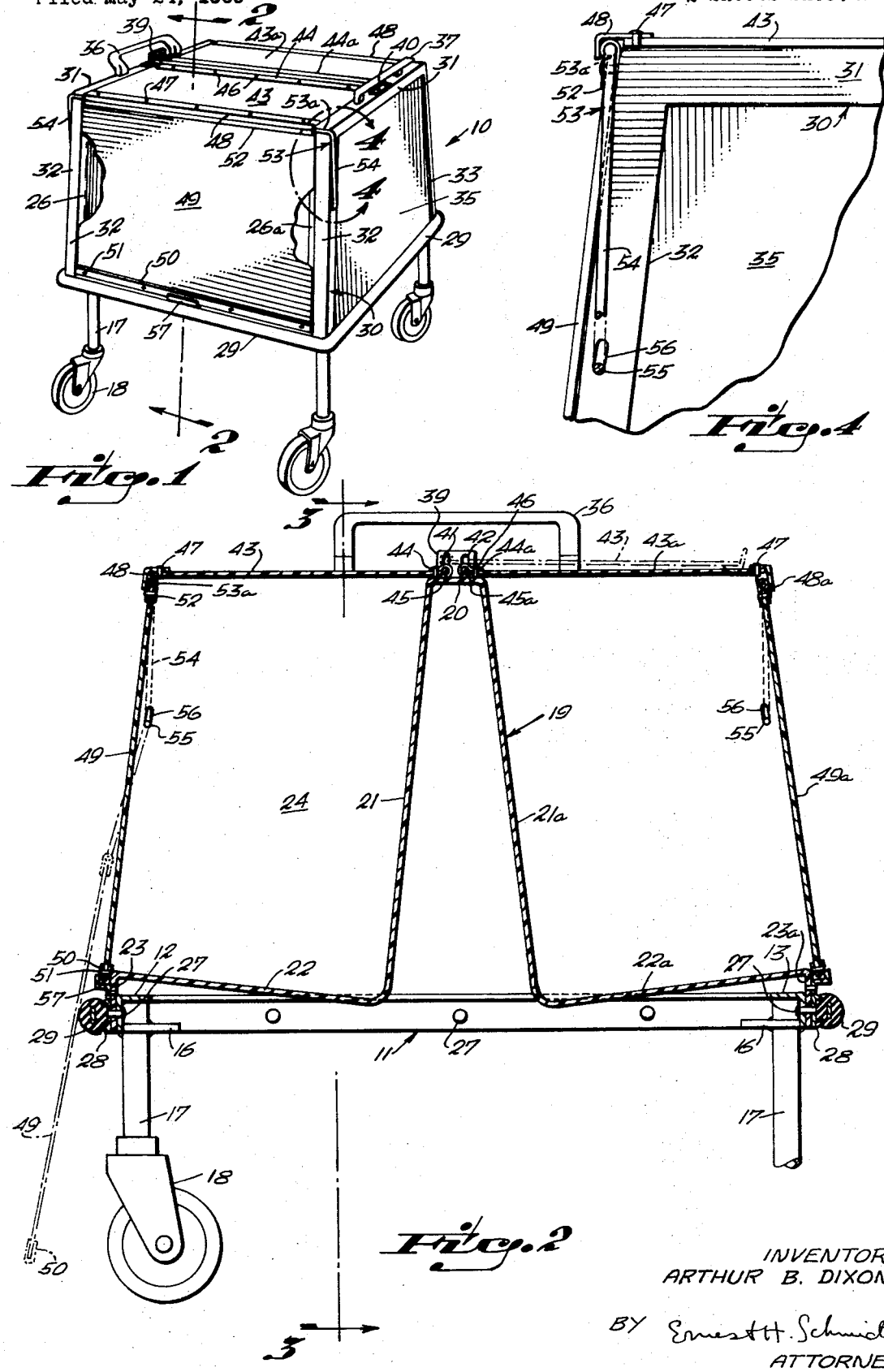

3,544,183
DISH CART
Arthur B. Dixon, Coral Gables, Fla., assignor to Shelly Manufacturing Company, a corporation of Florida
Filed May 29, 1969, Ser. No. 828,961
Int. Cl. A47b 91/00
U.S. Cl. 312—250                                      10 Claims

ABSTRACT OF THE DISCLOSURE

A low profile mobile dish cart of the type having opposed side compartments, each of which is open at the top and to the outside for ready access in the placement and removal of dishes and the like. Each of the compartments is provided with top lid and side cover members so hinged and linked to the compartment structure that either side cover member can readily be partially dropped to provide side access. Additionally, one or the other of the top lid members can be swung back against the other to provide top access to its compartment. Alternatively, instead of dropping a side cover member, it can be folded back over its associated top opening, the top lid first having been swung back upon the opposite top lid to provide full side access opening.

---

This invention relates to mobile carts for storing and transporting dishes and the like in cafeterias, restaurants, hospitals, etc., and is directed particularly to improvements to such carts adapted to roll under food counters or dish tables for convenience in use and storage.

Mobile dish carts for transporting dishes between kitchen and dining room areas in cafeterias, restaurants, institutions, etc., and having such a low profile as to roll under food counters and dish tables are known. Such carts usually are provided with separate compartments at each side, either completely open at the sides and top for ready access, or provided with hinged top and side cover panels, especially in insulated carts for keeping dishes hot until used in serving. Top and side cover panels as have heretofere been used in under-counter dish cart construction, however, have been deficient in one or more respects, principally in that they were either difficult or impossible to adjust between open and closed positions when placed for use beneath a counter, dish table or the like.

It is, accordingly, the principal object of this invention to provide an improved side and top cover lid arrangement and mechanism for under-counter mobile dish carts of the type having opposed dish storage compartments at each side, wherein the side cover members can be selectively dropped to provide substantially full access from the side by only slightly lifting upon the associated top cover member and, therefore, without the necessity for pulling the cart out from under a table or counter in the position of use.

It is another object of the invention to provide a mobile dish cart of the character described wherein, in addition to dropping of a side cover, the associated top lid can readily be folded back upon the opposite side cover to provide substantially complete top and side access to the compartment when loading or unloading in open use areas; that is, when not in confined areas under a counter or table.

It is a more particular object of the invention to provide a side and top cover arrangement for mobile dish carts of the character described wherein each side cover member is pivotly linked at each side of its upper end to opposite ends of the cart side opening at a position below the upper end of the opening substantially equal to the length of the connecting linkage, whereby the side lid can be swung up and down between fully closed and substantially fully open or dropped positions. The side cover is maintained in closed-compartment position at the bottom by means of a shallow socket member providing a groove for the seating of a lower marginal edge portion of the side cover, and secured at the top by a short flange or lip member provided at the outer end of the associated top lid, the top lid being hinged along its inner edge with respect to the cart to permit its lifting for release of the side cover, and, when desired, complete fold-back upon the opposite top lid to completely open a dish compartment.

Still another object is to provide a dish cart of the above nature which will be simple in construction, dependable in operation, attractive in appearance, easy to clean and durable in use.

Other objects, features and advantages of the invention will be apparent from the following description when read with reference to the accompanying drawings. In the drawings, wherein like reference numerals denote corresponding parts throughout the several views:

FIG. 1 is a perspective view of a dish cart embodying the invention;

FIG. 2 is a transverse, vertical cross-sectional view of the dish cart illustrated in FIG. 1, taken along the line 2—2 thereof in the direction of the arrows;

FIG. 4 is a partial end view, on an enlarged scale, of that zone of the cart indicated by the circular line 4—4 of FIG. 1.

Figure 3:
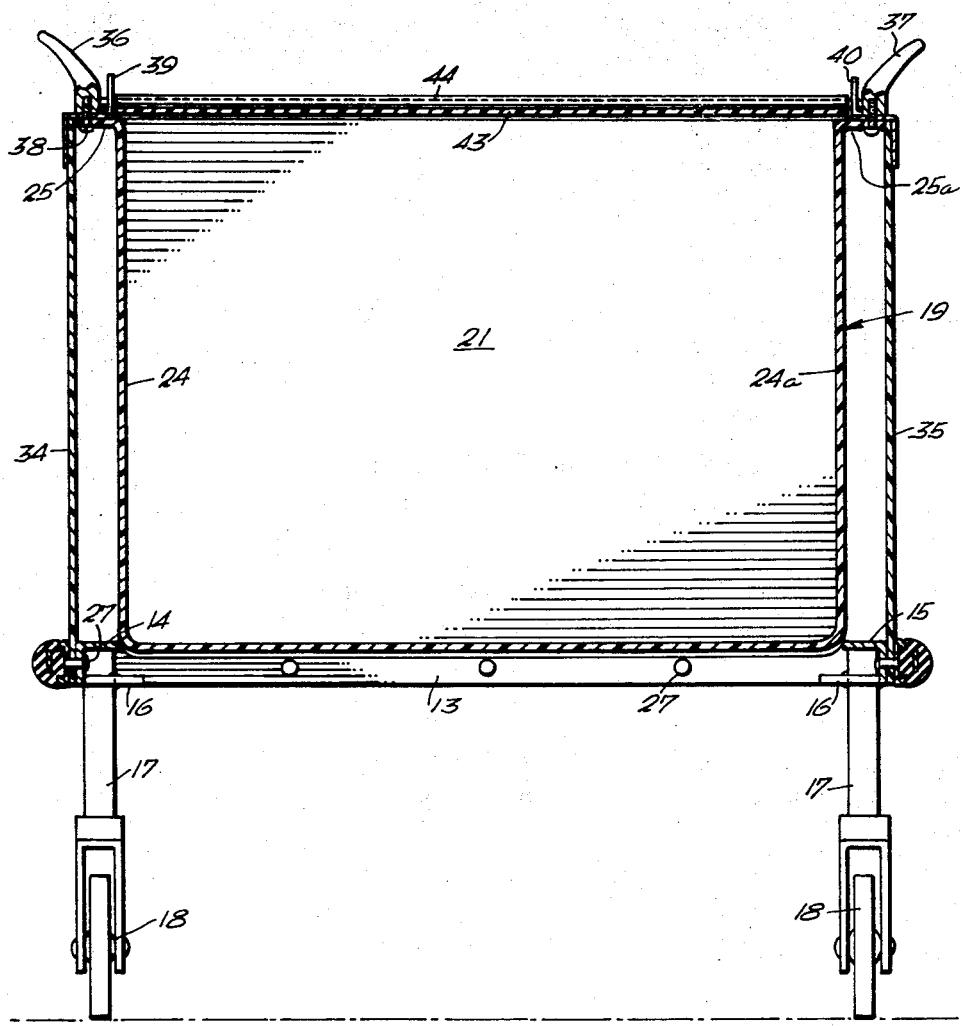
FIG. 3 is a longitudinal, vertical cross-sectional view of the dish cart, taken along the line 3—3 of FIG. 2, in the direction of the arrows.

Referring now in detail to the drawings, the numeral 10 in FIG. 1, designates a preferred form of dish cart embodying the invention. Referring to FIGS. 2 and 3, it will be seen that the dish cart comprises a rectangular frame 11, comprising welded-together angle iron side members 12 and 13, and angle iron end members 14 and 15. Each corner of the rectangular frame 11 has welded therein, on the underside and in spaced relation with respect to inwardly-projecting flange portions of said framework, corner plates 16. The corner plates 16 are provided with circular openings through which extend the upper end portions of short tubular legs 17, one in each corner, said legs being welded in place with respect to the framework 11. The lower ends of the tubular leg 17 are fitted with swivel casters 18, for cart mobility.

Secured to and extending upwardly of the rectangular cart frame 11, is a molded compartment body member 19, said body member preferably being integrally molded of a reinforced synthetic resin. The compartment body member 19 has an elongated, rectangular, top central portion 20, extending from end to end above the cart frame 11 and integrally formed with downwardly-extending, mutually-divergent inner wall portions 21 and 21a (see FIG. 2). The lower ends of the inner wall portions 21 and 21a extend downwardly substantially to the upper level of the rectangular frame 11, whereat they merge with opposed, outwardly-extending and slightly upwardly-inclined bottom portions 22 and 22a, respectively, which bottom portions terminate, at their outer ends, in downwardly-extending skirt portions 23, 23a. The inner surfaces of the skirt portions 23, 23a overlap the outer surfaces of the frame angle iron side members 12, 13 whereat they are riveted in place as by rivets 27 to secure the compartment body member 19 in place with respect to said frame. As illustrated in FIG. 3, the compartment body member 19, at each side, is also integrally formed with vertical end wall portions 24, 24a, the upper ends of which terminate in short, outwardly-extending flange portions 25, 25a. As illustrated in FIG. 2, the upwardly-extending end walls 24, 24a at each side of the compartment body member 19 are also integrally formed with outwardly-extending side wall portions 26, 26a.

Rivets 27 along the side members 12, 13 of the framework 11, in addition to securing the compartment body member 19 in place as described above, also secure a retainer strip 28 along the outside of said framework for securement threreat of a peripheral rubber bumper 29.

As best illustrated in FIG. 1, the ends of the cart structure are fitted with plated metal corner trim members 30, each of which has a top portion 31 enclosing the top corner zones of the compartment body member 19, and side portions 32 and 33, enclosing side wall corner portions of said compartment body member. The corner trim members 30 retain in place end panels 34 and 35, respectively (see FIG. 3), said corner trim members being secured in place at the top by machine screws 38 extending upwardly through the top flange portions 25 and 25a of the body member 19. As best illustrated in FIG. 3, the machine screws 38 also serve to secure in place cart end handles 36 and 37. Upwardly-extending pivot brackets 39 and 40, each of which has a pair of laterally-spaced, vertically-extending elongated openings 41 and 42, are secured to the top portions of the trim members 30 at central positions therealong, for the purpose hereinafter appearing.

The side compartments provided by the compartment body member 19 at each side of the cart are provided with top lids 43, 43a, each of which is fitted along its inner edge with an elongated retainer member 44, 44a, respectively, U-shaped in cross-section and adapted to retain thereat straight hinge pins 45, 45a, respectively, the outer ends of which are received in respective elongated openings 41 and 42 of the pivot brackets 39 and 40. The retainer members 44, 44a, may be secured in place with respect to the inner edges of their respective top lids 43, 43a as by rivets 46. Rivets 47 secure downwardly-extending angular hook members 48, 48a along the outer edges of the top lids 43, 43a, respectively, for the purpose hereinafter described.

Rectangular side cover members 49, 49a are provided also for covering the side openings of the opposed side compartments defined by the compartment body member 19. As illustrated in FIGS. 1, 2 and 4, each rectangular side cover member 49, 49a is provided along its lower marginal edge portion with a U-shaped reinforcing strip 50 secured in place with rivets 41. Elongated hinge members 52, U-shaped in cross-section and secured along the upper marginal edge portions of the side cover members 49, 49a retain, rotatably secured thereto, the straight, transverse hinge portions 53a of a hinge link member 53, the outer ends of which extend perpendicularly outwardly to provide end link portions 54 which terminate in inwardly-extending hook end portions 55. The hook end portions 55 are received in opposed, vertically-extending elongated openings 56 in the end panels 34, 35 (and their associated corner trim side portions 32 and 33) at each side of the cart at approximately one-third of the distance down between the upper and lower ends of the compartment body member 19, as illustrated in FIGS. 1, 2 and 4. The end link portions 54 of each hinge 53 are of such length that when the side cover members 49, 49a are in closed position with respect to their respective side openings, as illustrated by the full-line representation thereof in FIGS. 1, 3 and 4, the vertical lengths of the vertically-extending elongated openings 56 at each side of the cart will provide just enough vertical movement of its associated side cover as to permit its being lifted over the angular socket member 57 to seat therein for retention in place. When so retained in place, the angular hook member 48 of the associated top lid 43 will hook over the upper edge of the side cover member 49 to further secure it in place at the top. To provide side access to a compartment at each side of the cart, it is a simple matter merely to lift cover member 49 or 49a from the bottom just enough to disengage it from its socket member 57 and to allow it to swing downwardly on its hinge link member 53 to assume the broken-line position thereof (illustrated by the cover member 49 in FIG. 2). In so doing, it will be understood that the associated top lid member 43 or 44 will be moved upwardly about its inner hinge. It is to be noted that this upward movement of a side cover and its associated lid is so slight that it can be effected even though the cart is placed under a counter or table of sufficient height only to allow clearance of the cart end handles 36.

Figure 5:
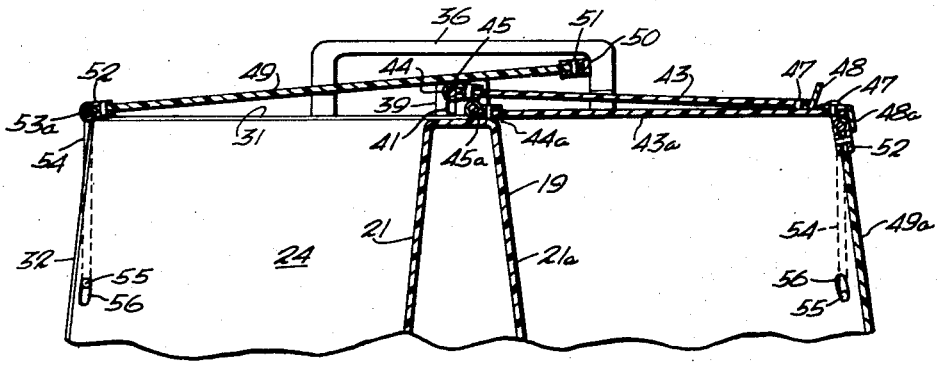
FIG. 5 is a partial cross-sectional view similar to that of FIG. 2, but illustrating how both the top lid and a side cover member of one compartment can be folded back against the opposite top lid to provide for complete opening of a compartment.

As illustrated by the broken line representation of lid 43 in FIG. 2, it will be seen that either of the top lids 43, 43a can be folded back upon the other, selectively, to provide full opening at the top of either compartment. When one of the side compartments is so opened at the top, the associated side cover member will normally also be dropped, as illustrated by the broken-line representation of the cover lid 43 and the side cover member 49 in FIG. 2, to provide substantially full access to a side compartment for ease in loading and unloading dishes, especially when the cart is in the open and ready access can be had to the top thereof. In this connection, it is to be noted that the vertically-extending openings 41 and 42 of the pivot brackets 39 and 40 are of such vertical length as to allow upward shifting of the hinged end of the folded-back lid member over the hinged end of the opposite lid member, as illustrated by the positional relation of the lid 43 with respect to the lid 43a in FIG. 5. With further reference to FIG. 5, it will be noted that still another positional arrangement of the compartment cover lid members is possible, as the vertically-extending elongated openings 56 are so located and of such length with respect to their elongated hook members 52 as to permit either of the side cover members 49 and 49a, selectively, to be swung backwardly and over the upper end of its compartment top opening, the top lid thereof first having been folded back against the opposite lid as described above. With this positional arrangement of the compartment side cover and top lid members, it will be seen that complete uncovering of the side of one of the compartments can be effected when desired.

While I have illustrated and described herein only one form in which the invention can conveniently be embodied in practice, it is to be understood that this embodiment is presented by way of example only and not in a limiting sense. The invention, in brief, comprises all the embodiments and modifications coming within the scope and spirit of the following claims.

What I claim is new and desire to secure by Letters Patent is:

1. Adjustable closure means for the top and side openings of a dish cart compartment or the like defined by a bottom wall portion, an inner wall portion and opposed end wall portions comprising, in combination, a rectangular side cover member of such size as to enclose said compartment side opening, elongated link means at each side of said side cover member, said link means each including means for swingably hinging at their inner ends with respect to an upper edge portion of said cover member for rotation about an axis substantially coincident with said upper edge portion of said cover member, means for journalling the other ends of said link means with respect to said compartment end wall portions near the outer edges thereof adjacent said side opening and at a distance below the upper ends of said compartment end wall portions substantially equal to the lengths of said elongated link means, said journalling means being operative to journal said other ends of said link means about an axis substantially parallel with said rotational axis, and a socket member secured with respect to said bottom compartment wall portion at the other end thereof and having a recess for the reception of a lower edge portion of said side cover member when said side cover member is in upwardly-swung closed position with respect to said compartment side opening, said journalling means being operative to permit sufficient play with respect to said link means in the vertical direction to enable raising of said cover member when in its closed position so that the lower edge portion thereof can be seated in said socket member recess.

2. An adjustable closure means for the top and side openings of a dish cart as defined in claim 1, wherein said journalling means comprises substantially vertically-extending openings in said compartment end wall portions, said link means being in the form of bent rod portions the outer ends of which have opposed, inwardly-turned, hook end portions received, one each, in said elongated openings.

3. An adjustable closure means for the top and side openings of a dish cart as defined in claim 2, wherein said elongated link means comprises the opposed, parallel, outwardly-bent portions of a substantially U-shaped rod, said swingably hinging means being comprised of the straight-central portion of said U-shaped rod, and an elongated U-shaped hinge member enclosing and rotatively securing said central portion along the upper edge of said side cover member.

4. An adjustable closure means for the top and side openings of a dish cart as defined in claim 1, including a rectangular top cover lid of such side as to enclose said compartment top opening, hinge means journalling the inner edge portion of said top lid along the upper end of said inner wall portion of said compartment, the outer edge portion of said top cover lid comprising downwardly-extending hook means operative, when said side cover member is in closed position with respect to its compartment side opening, to hookingly engage an upper edge portion of said side cover member to secure it in place thereat when said top lid is swung into its closed position with respect to said compartment top opening.

5. An adjustable closure means for the top and side openings of a dish cart as defined in claim 2, wherein said elongated openings are so located and of such length as to allow sufficient freedom of upward movement of said link rod portions to permit said side cover member to be swung backwardly over the upper ends of said compartment side walls to cover said compartment top opening.

6. A dish cart having opposed side compartments and adjustable cover means therefor, comprising, in combination, a rectangular frame member, a rollable support means for said frame member, an integrally molded compartment body member supported upon said frame member, said compartment member having opposed side compartments each of which is defined by opposed bottom wall portions, spaced back-to-back upstanding inner wall portions and opposed end wall portions, the upper ends of said inner wall portions merging with an elongated end-to-end central top wall portion, a rectangular side cover member for each of said compartments and of such size as to enclose their respective compartment side openings, elongated link means at each side of each of said side cover members, said link means of each of said side cover members each including means for swingably hinging at their inner ends with respect to an upper edge portion of its associated cover member for rotation about an axis substantially coincident with an upper edge portion thereof, means for journalling the other ends of said link means with respect to its associated compartment end wall portions near the outer edges thereof adjacent its side opening and at a distance below the upper ends thereof substantially equal to the lengths of said elongated link means, said journalling means each being operative to journal the other ends of its associated link means about an axis substantially parallel with said associated rotational axis, and socket members secured, one each, with respect to each of said bottom compartment wall portions at the outer ends thereof and having recesses for the reception of lower edge portions of their associated side cover members when said side cover members are in upwardly-swung closed position with respect to their compartment side openings, said journalling means permitting sufficient play with respect to their associated link means in the vertical direction to allow raising of their associated cover members when in closed positions so that their lower edge portions can be seated in their respective socket member recesses.

7. A dish cart as defined in claim 6, wherein said journalling means comprises substantially vertically-extending openings in said compartment end wall portions, said link means being in the form of bent rod portions the outer ends of which have opposed inwardly-turned hook end portions received in said elongated openings.

8. A dish cart as defined in claim 7, wherein said elongated link means each comprises the opposed, parallel, outwardly-bent portions of a substantially U-shaped rod, said swingably-hinging means each comprising the straight-central portion of one each of said rods, and an elongated U-shaped hinge member enclosing and rotatably securing one each of said central portions along the upper edge of one each of said cover members.

9. A dish cart as defined in claim 6, including a rectangular top cover lid for each of said compartment top openings and of such size as to individually enclose said top openings, means journalling inner edge portions of each of said top lids with respect to said end-to-end centrol top wall portion, the outer edge portion of each of said top lids comprising downwardly-extending hook means operative, when said side cover members are in closed position with respect to their associated compartment side openings to hookingly engage upper edge portions of their associated side cover members to secure them in place thereat when said top lids are swung into their closed positions with respect to their associated compartment top openings.

10. A dish cart as defined in claim 7, wherein said elongated openings are so located and of such length as to allow sufficient freedom of upward movement of said link rod portions to permit said side cover members being swung selectively backwardly over the upper end of their associated compartment side walls to cover the compartment top opening thereat.

References Cited
UNITED STATES PATENTS

| | | | |
|---|---|---|---|
| 2,450,233 | 9/1948 | Cummigs | 312—319 |
| 2,835,546 | 5/1958 | Rothschild | 312—117 |
| 3,445,150 | 5/1969 | Zartarian | 312—290 |
| 3,489,475 | 1/1970 | Boyce et al. | 312—290 |

BENJAMIN HERSH, Primary Examiner

R. R. SONG, Assistant Examiner

U.S. Cl. X.R.

220—34, 37; 280—79.2